United States Patent
Lee et al.

(10) Patent No.: US 10,932,240 B2
(45) Date of Patent: Feb. 23, 2021

(54) METHOD FOR TRANSMITTING SR IN WIRELESS COMMUNICATION SYSTEM AND TERMINAL THEREFOR

(71) Applicant: LG Electronics Inc., Seoul (KR)

(72) Inventors: Sangrim Lee, Seoul (KR); Hojae Lee, Seoul (KR); Dongkyu Kim, Seoul (KR); Myeongjin Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/345,017

(22) PCT Filed: Jan. 31, 2017

(86) PCT No.: PCT/KR2017/001012
§ 371 (c)(1),
(2) Date: Apr. 25, 2019

(87) PCT Pub. No.: WO2018/084382
PCT Pub. Date: May 11, 2018

(65) Prior Publication Data
US 2019/0281619 A1     Sep. 12, 2019

Related U.S. Application Data

(60) Provisional application No. 62/415,520, filed on Nov. 1, 2016.

(51) Int. Cl.
*H04W 72/04*     (2009.01)
*H04W 72/12*     (2009.01)
*H04L 5/00*      (2006.01)

(52) U.S. Cl.
CPC ....... *H04W 72/0413* (2013.01); *H04L 5/0053* (2013.01); *H04L 5/0055* (2013.01);
(Continued)

(58) Field of Classification Search
CPC .......... H04W 72/0413; H04W 72/042; H04W 72/1268; H04W 72/1273; H04W 72/0453; H04L 5/0053; H04L 5/0055; H04L 5/091
See application file for complete search history.

(56) References Cited

U.S. PATENT DOCUMENTS

2012/0039279 A1   2/2012   Chen et al.
2012/0257552 A1   10/2012  Chen et al.
(Continued)

FOREIGN PATENT DOCUMENTS

KR   1020100071791 A   6/2010
WO   2010002307 A1     1/2010

OTHER PUBLICATIONS

Intel Corporation, "Scheduling request design for NR", 3GPP TSG-RAN WG1 #86bis, Oct. 10-14, 2016, R1-1610191.

*Primary Examiner* — Andrew Lai
*Assistant Examiner* — Mohammed M Murshid
(74) *Attorney, Agent, or Firm* — Dentons US LLP

(57) ABSTRACT

A method by which a terminal transmits a scheduling request (SR) in a wireless communication system, according to the present invention, comprises the steps of: receiving information on periodicity of SR transmission and a resource region for periodical SR transmission; receiving downlink control information (DCI) which includes a field related to an SR transmission region in a first subframe; and confirming whether the resource for the SR transmission of the terminal is allocated in the first subframe, even if the first subframe is not the subframe for the periodical SR transmission of the terminal, according to the periodicity of the SR transmission, when a SR field indicates a specific value.

16 Claims, 8 Drawing Sheets

DL control zone
 UL control zone
 SR zone for A group implicitly
 SR zone for B group implicitly

(52) U.S. Cl.
  CPC ......... *H04L 5/0091* (2013.01); *H04W 72/042* (2013.01); *H04W 72/1268* (2013.01); *H04W 72/1273* (2013.01); *H04W 72/0453* (2013.01)

(56) References Cited

U.S. PATENT DOCUMENTS

| | | |
|---|---|---|
| 2015/0230234 A1 | 8/2015 | Choi et al. |
| 2015/0289251 A1* | 10/2015 | Koc ................ H04B 1/3827 |
| | | 370/311 |
| 2016/0073394 A1 | 3/2016 | Kim et al. |
| 2016/0100382 A1* | 4/2016 | He .................. H04L 5/0094 |
| | | 370/329 |
| 2017/0289993 A1 | 10/2017 | Yerramalli et al. |
| 2018/0014301 A1* | 1/2018 | Chen ................ H04L 1/1896 |
| 2018/0019843 A1 | 1/2018 | Papasakellariou |
| 2018/0332626 A1* | 11/2018 | You ................ H04W 72/042 |
| 2019/0313375 A1* | 10/2019 | Loehr ................ H04W 72/04 |

\* cited by examiner

Group A
 Group B
 Group C
 Group D

Group A
 Group B
 Group C
 Group D

METHOD FOR TRANSMITTING SR IN WIRELESS COMMUNICATION SYSTEM AND TERMINAL THEREFOR This application is a National Stage Entry of International Application No. PCT/KR2017/001012 filed Jan. 31, 2017, which claims priority to U.S. Provisional Application No. 62/415,520 filed Nov. 1, 2016, all of which are incorporated herein by reference.

TECHNICAL FIELD

The present disclosure relates to wireless communication, and more particularly, to a method of transmitting a Scheduling Request (SR) in a wireless communication system and terminal therefor.

BACKGROUND

As more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications.

Communication system design considering services/UEs sensitive to reliability and latency is also under discussion. Thus, the introduction of next-generation RAT considering enhanced Mobile Broadband (eMBB) communication, massive MTC (mMTC), and Ultra-Reliable and Low Latency Communication (URLLC) is being discussed. In the present disclosure, for simplicity, this technology will be referred to as new RAT.

DISCLOSURE OF THE INVENTION

Technical Task

The first object of the present disclosure is to provide a method by which a terminal transmits a Scheduling Request (SR) in a wireless communication system.

The second object of the present disclosure is to provide a terminal for transmitting a Scheduling Request (SR) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve the first object, provided is a method of transmitting a Scheduling Request (SR) by a terminal in a wireless communication system. The method may include: receiving information on periodicity of SR transmission and resource regions for periodic SR transmission; receiving Downlink Control Information (DCI) including a field related to SR transmission regions in a first subframe; and when the SR field indicates a specific value, checking whether resources for the SR transmission of the terminal are allocated to the first subframe even though the first subframe is not a subframe for the periodic SR transmission of the terminal according to the periodicity of the SR transmission.

The checking may include obtaining the number of groups, to which the SR transmission is additionally assigned in the first subframe based on the specific value and checking whether the terminal belongs to a group, to which the SR transmission is additionally assigned.

The method may further include, when it is checked that the resources for the SR transmission of the terminal are allocated to the first subframe, transmitting, by the terminal, the SR in the first subframe.

An SR transmission resource region of the terminal in the first subframe may be distinguished from an SR transmission resource region of another terminal transmitting an SR in the first subframe according to the periodicity.

The SR transmission resource region of the terminal in the first subframe may be distinguished from an SR transmission resource region of another terminal transmitting an SR in the first subframe by at least one of a Resource Block (RB), an Orthogonal Cover Code (OCC), and a Cyclic Shift (CS) value according to the periodicity.

The information on the periodicity of the SR transmission and the resource regions for the periodic SR transmission may be received through Radio Resource Control (RRC) signaling. The DCI may correspond to common DCI applied to other terminals besides the terminal. The specific value indicated by the SR field may indicate a size of a resource region for the SR transmission.

The method may further include, when it is checked that the terminal belongs to the group, to which the SR transmission is additionally assigned, transmitting, by the terminal, the SR in the first subframe.

To achieve the second object, provided is a terminal for transmitting a Scheduling Request (SR) in a wireless communication system. The terminal may include: a receiver configured to receive information on periodicity of SR transmission and resource regions for periodic SR transmission and receive Downlink Control Information (DCI) including a field related to SR transmission regions in a first subframe; and a processor configured to, when the SR field indicates a specific value, check whether resources for the SR transmission of the terminal are allocated to the first subframe even though the first subframe is not a subframe for the periodic SR transmission of the terminal according to the periodicity of the SR transmission.

The processor may be configured to obtain the number of groups, to which the SR transmission is additionally assigned in the first subframe based on the specific value and check whether the terminal belongs to a group, to which the SR transmission is additionally assigned.

The terminal may further include a transmitter configured to transmit the SR in the first subframe when the processor checks that the resources for the SR transmission of the terminal are allocated to the first subframe An SR transmission resource region of the terminal in the first subframe may be distinguished from an SR transmission resource region of another terminal transmitting an SR in the first subframe according to the periodicity. The SR transmission resource region of the terminal in the first subframe may be distinguished from an SR transmission resource region of another terminal transmitting an SR in the first subframe by at least one of a Resource Block (RB), an Orthogonal Cover Code (OCC), and a Cyclic Shift (CS) value according to the periodicity. The receiver may be configured to receive the information on the periodicity of the SR transmission and the resource regions for the periodic SR transmission through Radio Resource Control (RRC) signaling. The DCI may correspond to common DCI applied to other terminals besides the terminal. The specific value indicated by the SR field may indicate a size of a resource region for the SR transmission. The terminal may further include a transmitter configured to transmit the SR in the first subframe when the processor checks that the terminal belongs to the group, to which the SR transmission is additionally assigned.

Advantageous Effects

According to the present disclosure, SR transmission resources can be flexibly allocated, thereby improving communication performance in the 5G systems.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention and are incorporated in and constitute a part of this specification, illustrate embodiments of the invention.

MODE FOR INVENTION

Figure 1:
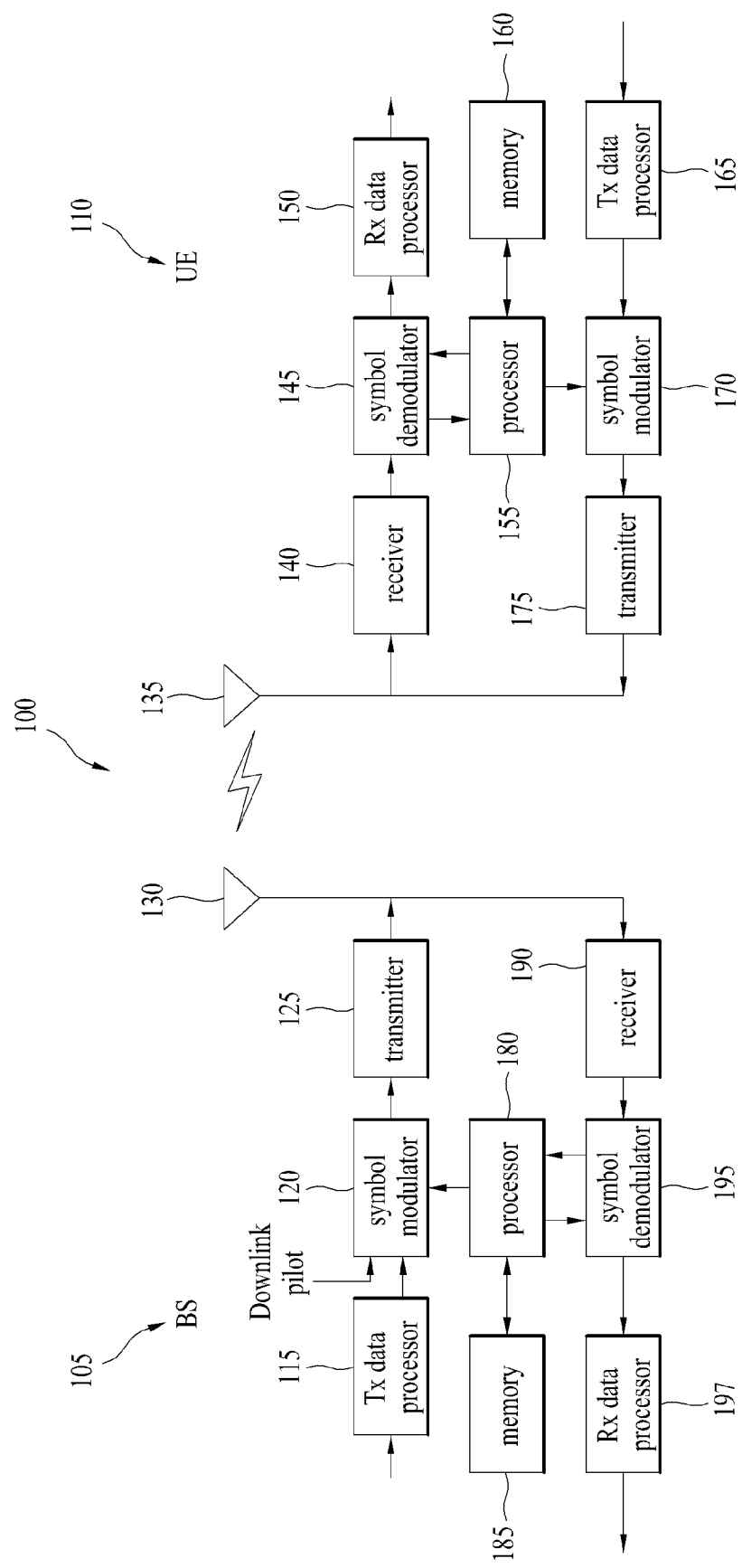
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Figure 2:
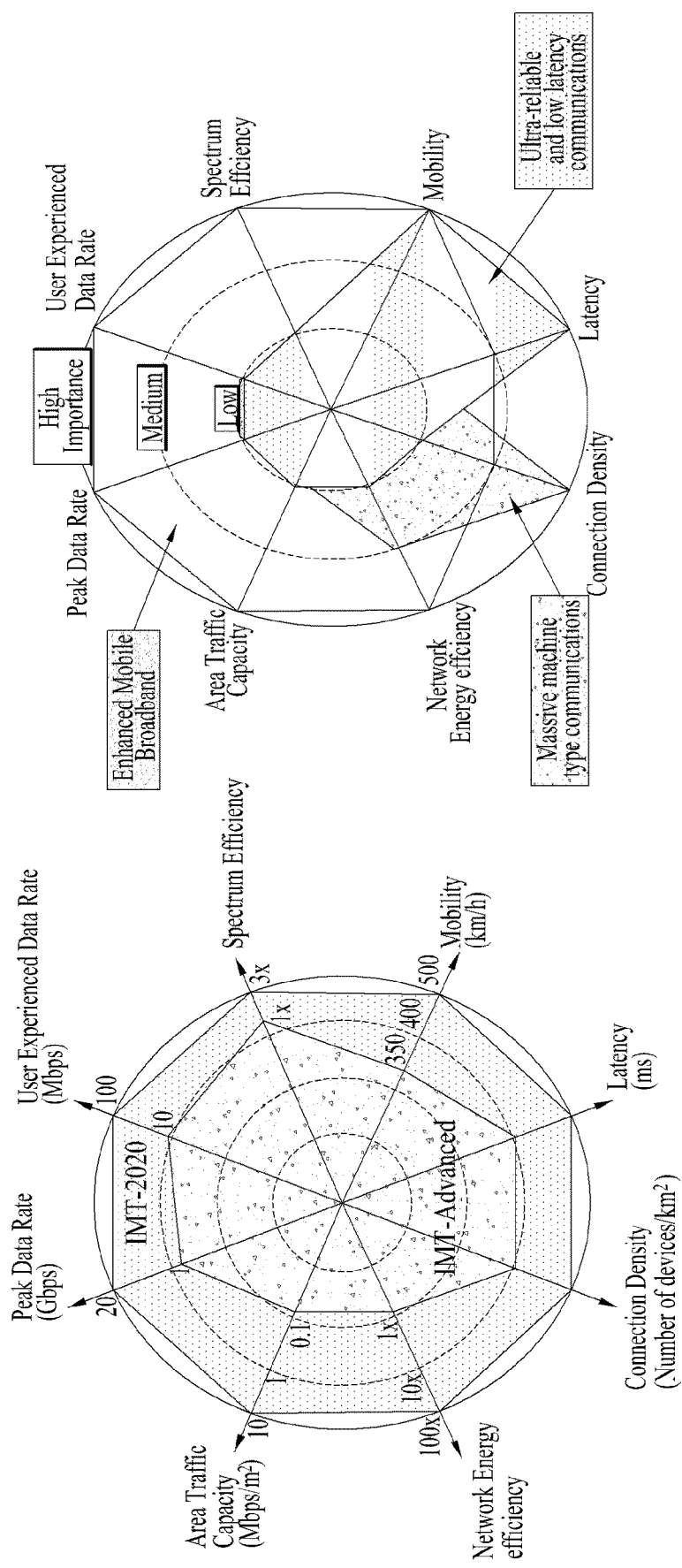
FIG. 2 is a diagram for explaining relation between IMT 2020 core performance requirements for 5G and 5G performance requirements for each service scenario.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

To minimize latency in 5G new RAT, the structure shown in FIG. 2, where Time Division Multiplexing (TDM) is applied to control and data channels, can be considered as one frame structure.

The present disclosure proposes various new frame structures for the fifth generation (5G) communication system. In the next generation 5G system, scenarios can be divided into Enhanced Mobile Broadband (eMBB), Ultra-reliable Machine-Type Communications (uMTC), Massive Machine-Type Communications (mMTC), etc. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. (for example, the uMTC may include V2X, emergency services, remote control, etc.). The mMTC corresponds to a next generation mobile communication scenario characterized by low cost, low energy, short packets, massive connectivity, etc. (for example, the mMTC may include Internet of Things (IoT)).

FIG. 2 is a diagram for explaining relation between IMT 2020 core performance requirements for 5G and 5G performance requirements for each service scenario.

FIG. 2 illustrates the relation between the core performance requirements for 5G, which are proposed in IMT 2020, and the 5G performance requirements for each service scenario.

In particular, uMTC services have extremely restricted Over-The-Air (OTA) latency requirements and requires high mobility and reliability (OTA Latency: <1 ms, Mobility: >500 km/h, and BLER: <$10^{-6}$).

Figure 3:
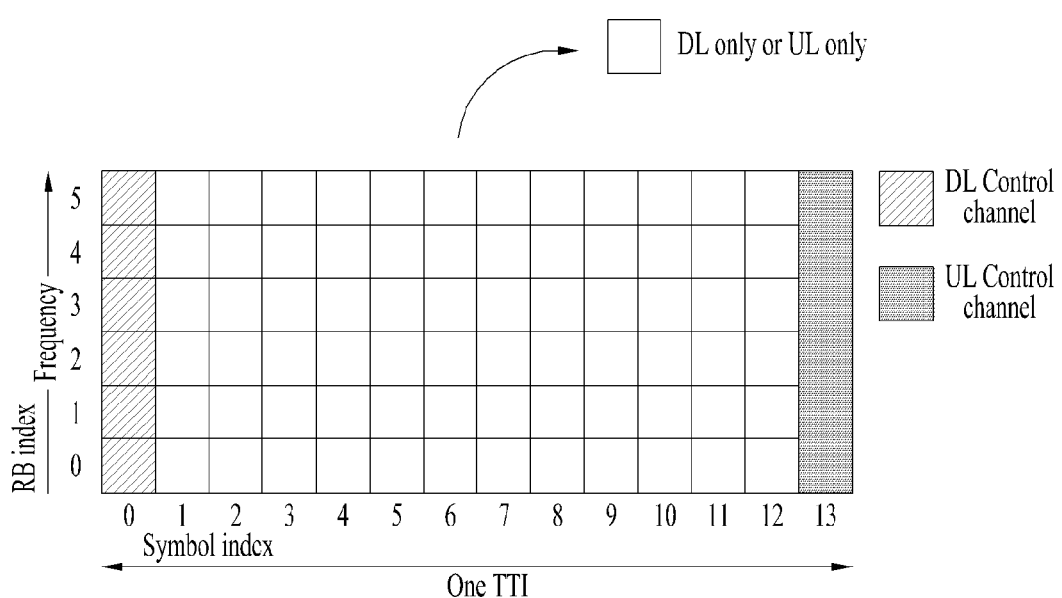
FIG. 3 is a diagram illustrating the structure of a subframe where TDM is applied to data and control channels.

FIG. 3 is a diagram illustrating the structure of a subframe where TDM is applied to data and control channels.

Specifically, FIG. 3 shows that TDM is applied to data and control channels in one subframe. In FIG. 3, the hatched area represents a Downlink (DL) control region (i.e., a resource region in which a DL control channel is transmitted), and the black area represents an Uplink (UL) control region (i.e., a resource region in which a UL control channel is transmitted). The unmarked area in the subframe of FIG. 3 can be used for DL or UL data transmission. According to this structure, it is possible to transmit DL data and receive UL ACK/NACK in a single subframe since DL transmission and UL transmission are sequentially performed in the single subframe. Consequently, when a data transmission error occurs, it is possible to reduce a time required until data is retransmitted, thereby minimizing the latency of the overall data transmission.

In the above subframe structure where the data and control channels are Time Division Multiplexed (TDMed), a time gap is required to allow a BS and a UE to switch from transmission mode to reception mode or vice versa. To this end, some Orthogonal Frequency Division Multiplexing (OFDM) symbols at the DL-to-UL switching time can be configured as a Guard Period (GP) in this subframe structure.

In FIG. 3, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration that the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 3, the unmarked area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

In the legacy LTE system, a UE cam transmit a Scheduling Request (SR) at an implicit location in a UE-specific manner. It could be said that this operation is possible since only up to $2^{16}$ C-RNTIs can exist. Meanwhile, the connectivity of mMTC has been considered as 1,000,000/km². Assuming that mMTC UEs are in the RRC_CONNECTED state, the amount of resources reserved for SR transmission at an implicit location may increase about 20 times. That is, 40 RBs should be reserved, which are 20 times greater than 2 RBs, which are located at the both ends in the frequency domain, for UE's SR transmission in the legacy LTE system. Since the 40 RBs occupy a large part of the entire system bandwidth, the amount of resources that can be used for data transmission and reception may be significantly reduced. Therefore, a new SR transmission method capable of supporting massive connectivity is required.

Unlike the legacy LTE system operating based on a fixed DL/UL subframe configuration, an operation of dynamically changing a DL/UL resource portion (e.g., a data region) in a single subframe or DL/UL resource portions in a period composed of multiple subframes based on the above-described self-contained subframe type depending on DL/UL traffic situations (i.e., dynamic TDD operation) can be considered in the New RAT (NR) system.

Meanwhile, as shown in FIG. 3, the self-contained subframe type may have a structure where a UL control channel occupying one or a small number of symbol periods is transmitted after being TDMed with a DL data channel or a UL data channel in one subframe for the purpose of reducing latency of data (e.g., DL data) transmission.

In addition, the NR system has concerned aperiodic Channel State Information (CSI) reporting more than periodic CSI reporting. To this end, it is desirable to send a CSI report in a UL data region (e.g., PUSCH) rather than a UL control region (e.g., PUCCH). Thus, it may be considered that a UL control zone is configured with an ACK/NACK for DL data and an SR. In this specification, the term 'zone' may mean a channel, a resource region, etc.

Figure 4:
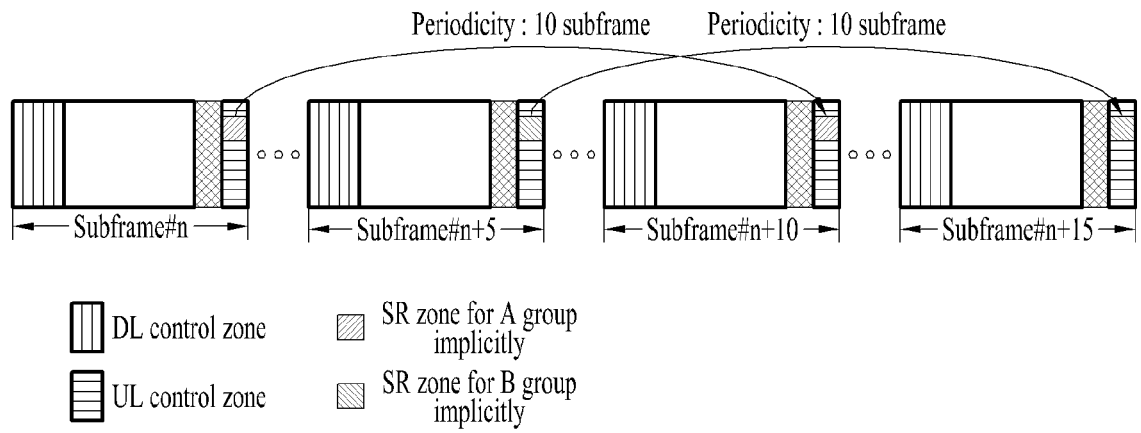
FIG. 4 is a diagram illustrating SR time-frequency transmission regions.

As in the current LTE system, the locations of periodic SR resources of a UE may be semi-persistently configured and managed as shown in FIG. 4.

FIG. 4 is a diagram illustrating SR time-frequency transmission regions.

FIG. 4 illustrates a conventional SR transmission method of the legacy LTE system. First, a BS may UE-specifically configure the locations of SR resources in the time and frequency domains through RRC signaling. That is, as shown in FIG. 4, the BS periodically allocates UEs belong to A group their SR-transmittable resources every 10 subframes. In the case of a start subframe, the BS allocates a subframe number by considering a corresponding period. UEs belong to B group are allocated a start subframe shifted by 5 subframes compared to that allocated to A group. They are allocated SR-transmittable resources every 10 subframe i.e., with the same periodicity.

In addition, the BS may allocate orthogonal resources to UEs in one subframe using frequency resources for multiplexing of transmitting UEs, Orthogonal Cover Codes (OCCs), Cyclic shift (CS) values, etc. For example, the BS allocate resource #3 among a total of 36 resources, i.e., 12 OCC resources and 3 CS resources to UE #1 among the UEs belonging to A group and resource #4 to UE #2 so that UEs can be allocated orthogonal resources. The present disclosure proposes a method of dynamically linking resources for an SR zone with DCI (herein, the SR zone may mean resources for SR transmission such as an SR channel, an SR resource region, etc.).

Dynamic SR Zone Method

If a UL control zone (or a UL control channel) is configured only with an ACK/NACK and an SR, the ACK/NACK depends on the amount of DL data. That is, when a UE receives a small amount of DL data, a small resource space is required for ACK/NACK transmission. However, when a BS transmits no DL data, no ACK/NACK transmission region is used. Thus, the present disclosure proposes a method of using a resource space that is not used for a UL control zone as resources for SR transmission when a UE receives a small amount of DL data.

Proposed method 1: The size of an SR zone can be defined by common DCI in each subframe, and a UE implicitly determines whether to transmit an SR depending on the size of a corresponding SR zone.

Figure 5:
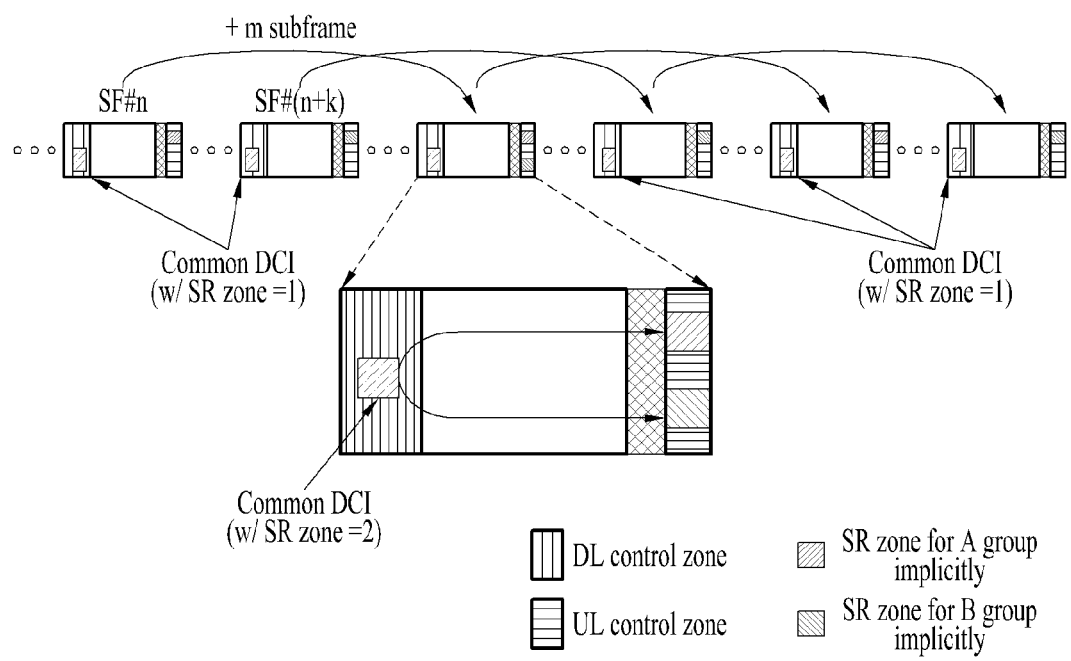
FIG. 5 is a diagram illustrating an SR time-frequency transmission region linked with common DCI.

FIG. 5 is a diagram illustrating an SR time-frequency transmission region linked with common DCI.

First, a UE can obtain information on a period for SR transmission (e.g., a period configured on a subframe basis) and information on transmission resource regions (e.g., frequency regions for SR transmission) through higher layer signaling (e.g., RRC signaling). FIG. 5 illustrates a method of extending an SR time-frequency transmission region using an SR zone related field in common DCI. First, the SR zone value of '1' is regarded as a default. That is, when the SR zone value is '1', a UE recognizes its SR resource transmission region based on a period value transmitted through RRC signaling. When the SR zone value is not '1', UEs recognize that SR zones are extended and check whether there are available resources.

For example, a region in which only UEs implicitly assigned as A group can perform SR transmission is present in subframe #n+m (SF #(n+m)) as shown in FIG. 5. However, when UEs of B group check that the SR zone value in the common DCI is set to '2', the UEs recognize that a region in which they can perform the SR transmission is also present in the corresponding subframe. When the value of an SR zone related field in common DCI is '2', a UE may recognize that the size of a resource region for SR transmission increase compared to when the default value is '1'. Thus, the UEs belonging to B group can perform the SR transmission in SF #(n+m). To this end, a method of performing allocation in a time-frequency region promised by a BS and a UE is required. First, a UE may consider the following methods to check whether an SR region in which the UE can perform transmission is present in a corresponding subframe. For example, UEs may operate as shown in FIG. 6.

Figure 6:
FIG. 6 is a diagram illustrating an example in which there is a gap of N subframes between groups and each of the group has a period of 4N subframes.
Figure 6:
Figure 6:
Figure 6:
Figure 6:
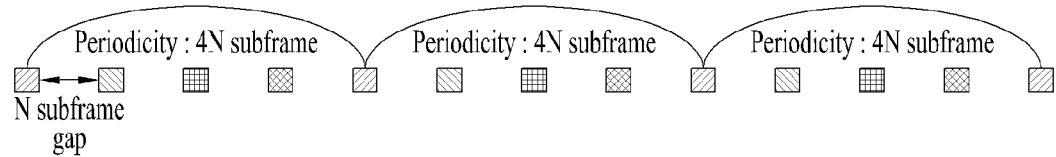

FIG. 6 is a diagram illustrating an example in which there is a gap of N subframes between groups and each of the group has a period of 4N subframes.

Specifically, FIG. 6 shows that there are a total of 4 groups. It is assumed that a transmission time difference between each group is N subframes and each group has a transmission period of 4N subframes. In this case, if the SR zone value in common DCI is changed to '2', UEs may operate as shown in FIG. 7.

Figure 7:
FIG. 7 is a diagram illustrating an example of allocating additional SR regions when an SR zone value is '2'.
Figure 7:
Figure 7:
Figure 7:
Figure 7:
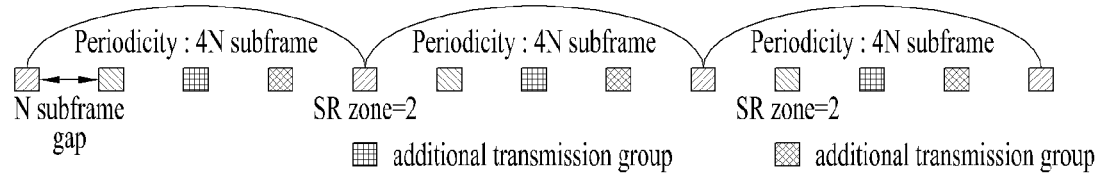

FIG. 7 is a diagram illustrating an example of allocating additional SR regions when an SR zone value is '2'.

First, the case of SR zone=2 illustrated in the left side of FIG. 7 will be described. If the SR zone value of a subframe where UEs of group A perform SR transmission is indicated as '2', UEs of group C can also perform the SR transmission using additionally allocated resources in the corresponding subframe of which the SR zone value is indicated as '2' since a subframe corresponding to a half of the transmission period (4N subframes) of the corresponding group (group A) is equivalent to a subframe where the UEs of group C perform the SR transmission. In this case, the UEs of group A and the UEs of group C can perform the SR transmission in the same subframes.

Next, the case of SR zone=2 illustrated in the right side of FIG. 7 will be described. If the SR zone value of a subframe where UEs of group B perform the SR transmission is indicated as '2', UEs of group D can also perform the SR transmission using additionally allocated resources in the corresponding subframe of which the SR zone value is indicated as '2' since a subframe corresponding to a half of the transmission period (4N subframes) of the corresponding group (group B) is equivalent to a subframe where the UEs of group D perform the SR transmission. In this case, the UEs of group B and the UEs of group D can perform the SR transmission in the same subframes.

Figure 8:
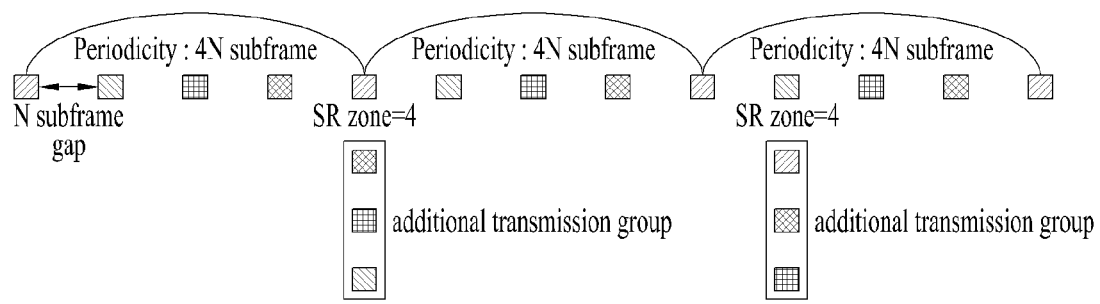
FIG. 8 is a diagram illustrating an example of allocating additional SR regions when an SR zone value is '4'.

FIG. 8 is a diagram illustrating an example of allocating additional SR regions when an SR zone value is '4'.

When the value of an SR zone related field in common DCI is '4', a UE may recognize that the size of a resource region for SR transmission increase compared to when the default value is '1' or '2'. When the value of the SR zone related field is 4, additional transmission groups can be assigned as shown in FIG. 8. Specifically, there may occur additional transmission groups as many as (SR zone value−1). In addition, transmission groups can be added such that a group with the largest time difference from a corresponding group is first added, and then a group with the second largest time different therefrom is added.

First, the case of SR zone=4 illustrated in the left side of FIG. 8 will be described. If the SR zone value of a subframe where UEs of group A perform SR transmission is indicated as '4', there occurs additional transmission groups as many as SR zone value−1 (i.e., 4−1=3) (that is, three additional transmission groups occurs). In this case, since there are a total of four groups, the remaining groups, i.e., group B, group C, and group D are allocated as the additional transmission groups. Thus, in the subframe of which the SR zone value is indicated as '4', not only the UEs of group A but also UEs of groups B, C, and D can perform the SR transmission. In this case, the total three groups can be added such that group C farthest from group A is first added, and then groups B and D second farthest from group A are added.

Next, the case of SR zone=4 illustrated in the right side of FIG. 8 will be described. Similarly, there occurs additional transmission groups as many as SR zone value−1 (i.e., 4−1=3) (that is, three additional transmission groups occurs). In this case, the total three groups can be added such that group C farthest from group B is first added, and then groups A and D second farthest from group B are added.

Figure 9:
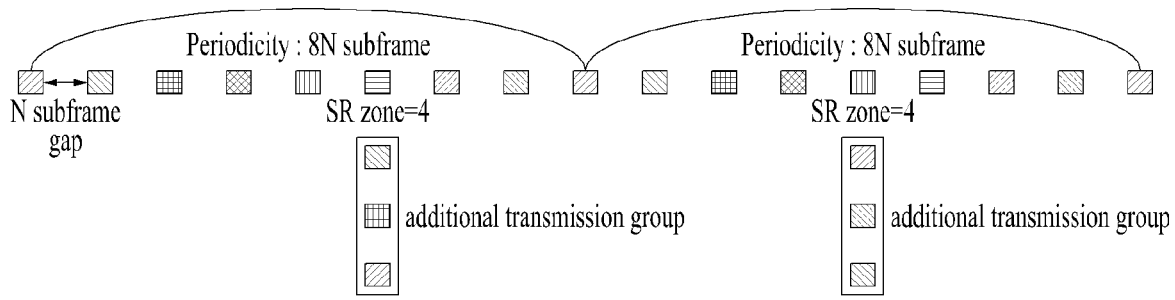
FIG. 9 is a diagram illustrating another example of allocating additional SR regions when an SR zone value is '4'

FIG. 9 is a diagram illustrating another example of allocating additional SR regions when an SR zone value is '4'

Specifically, FIG. 9 shows an example of allocating additional SR regions when each group has an SR transmission period of 8N subframes and an SR zone value is '4'. First, the case of SR zone=4 illustrated in the left side of FIG. 9 will be described. If the SR zone value of a subframe where UEs of group F perform SR transmission is indicated as '4', there occurs additional transmission groups as many as SR zone value −1 (i.e., 4−1=3) (that is, three additional transmission groups occurs). In this case, since there are a total of eight groups, the additional transmission groups may be selected in descending order of distance from group F (group A, group B, and group C are selected in FIG. 9). Thus, in the subframe of which the SR zone value is indicated as '4', not only the UEs of group F but also UEs of groups A, B, and C can perform the SR transmission.

Next, the case of SR zone=4 illustrated in the right side of FIG. 9 will be described. If the SR zone value of a subframe where UEs of group E perform SR transmission is indicated as '4', there occurs additional transmission groups as many as SR zone value−1 (i.e., 4−1=3) (that is, three additional transmission groups occurs). In this case, since there are a total of eight groups, the additional transmission groups may be selected in descending order of distance from group E (group A, group B, and group H are selected in FIG. 9). Thus, in the subframe of which the SR zone value is indicated as '4', not only the UEs of group E but also UEs of groups A, B, and H can perform the SR transmission.

The above-described method can be equally applied when a gap between each group is N subframes and each group has a transmission period of M×N.

Figure 10:
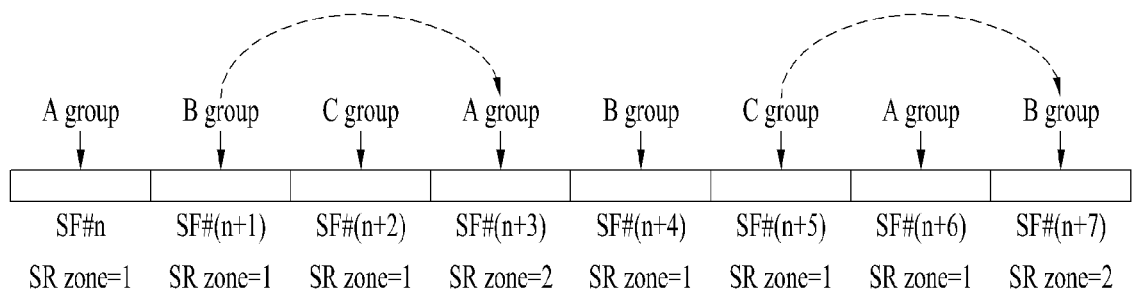
FIG. 10 is a diagram for explaining a method of allocating additional SR transmission resources in the case of SR zone=2.

FIG. 10 is a diagram for explaining a method of allocating additional SR transmission resources in the case of SR zone=2.

When common DCI indicates that SR zone=2, it could be interpreted to mean that in the current subframe, a resource region for additional SR transmission is allocated to a UE group assigned in a second previous SR region. Here, the second previous SR region is defined as an SR offset.

As shown in FIG. 10, when DCI received in SF #(n+3) indicates that SR zone=2, UEs of group B, which are implicitly assigned in the second previous subframe, recognize that they are allocated a resource region for SR transmission in corresponding SF #(n+3). Thus, the UEs of B group can perform the SR transmission in corresponding SF #(n+3).

In addition, in SF #(n+7), UEs of group C, which are implicitly assigned in the second previous subframe, SF #(n+5), can recognize that they are allocated a resource region for SR transmission in SF #(n+7) and thus perform transmission the SR transmission in SF #(n+7).

Figure 11:
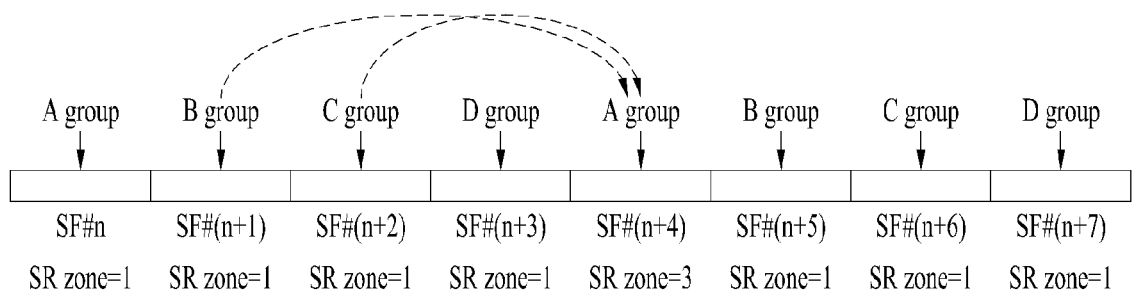
FIG. 11 is a diagram for explaining a method of allocating additional SR transmission resources in the case of SR zone=3.

FIG. 11 is a diagram for explaining a method of allocating additional SR transmission resources in the case of SR zone=3.

Referring to FIG. 11, when an SR zone has the value of '3', two additional resource regions are allocated. Thus, UEs of group B assigned SR transmission in the second previous subframe and UEs of group C, to which the SR transmission is assigned in the third previous subframe recognize that they are allocated regions for the SR transmission in SF #(n+4) and thus perform the SR transmission in SF #(n+4).

Assuming that the value of an SR zone is 'N', UE groups which are assigned in the range from an (N−1)th previous SF to an SF located an SR offset before from the current SF recognize that they are allocated SR zones in the corresponding SF. Here, the SR offset value may be predefined by a network. Alternatively, the SR offset value may be configured cell-specifically or group-specifically.

In addition, an implicit indication is additionally required for a frequency region. To this end, FIG. 12 can be considered.

Figure 12:
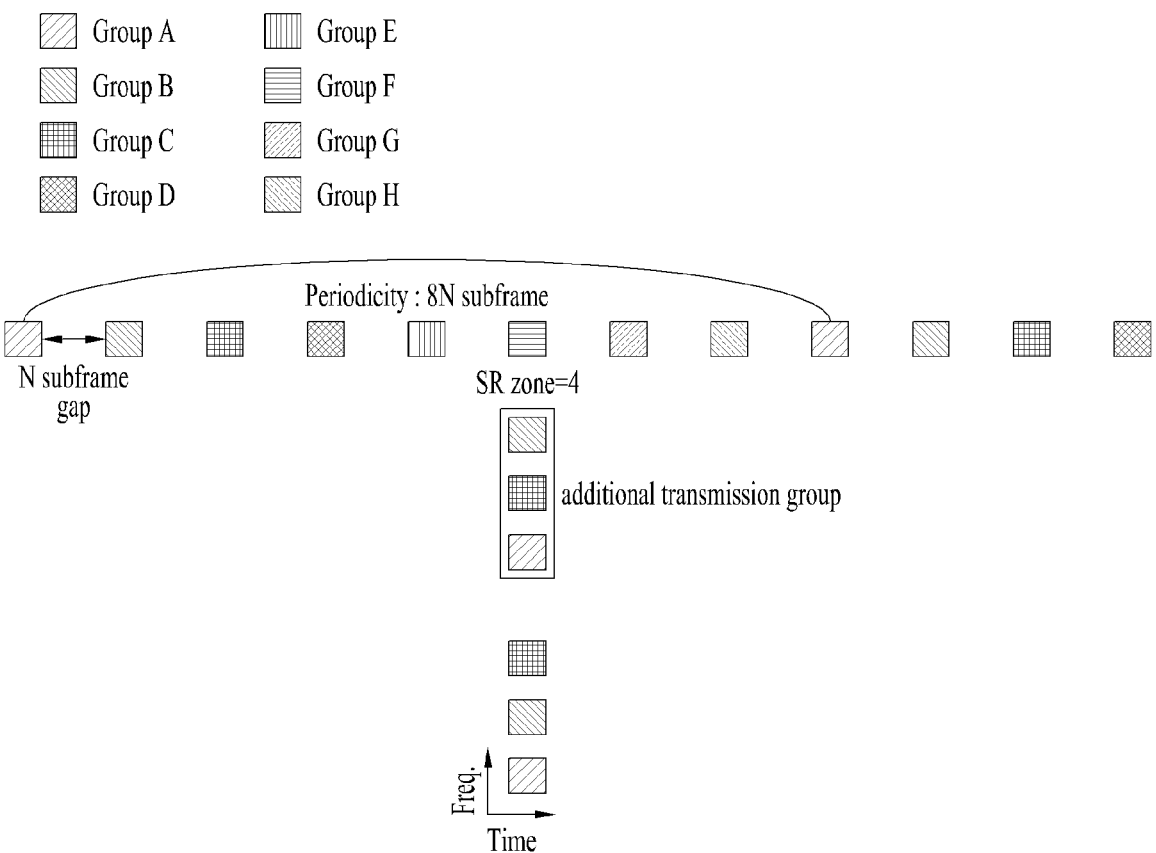
FIG. 12 is a diagram illustrating an example of allocating additional SR regions when each group has a transmission period of 8N subframes and an SR zone value is '4'.

FIG. 12 is a diagram illustrating an example of allocating additional SR regions when each group has a transmission period of 8N subframes and an SR zone value is '4'.

Referring to FIG. 12, the following methods can be considered for allocation of frequency regions. As shown in the bottom part of FIG. 12, a method of allocating a group closest to an SF located prior to a corresponding SF to the highest frequency region may be considered, and the reverse method may also be considered.

In addition, if the value of an SR zone related field is added to a method of performing allocation in an implicit manner based on a Resource Block (RB)/an Orthogonal Cover Code (OCC)/a Cyclic Shift (CS) value, an SR zone (i.e., a resource region for SR transmission) can be allocated for each additional transmission group based on the zone/RB/OCC/CS value. Information on the SR zone (i.e., the resource region for the SR transmission) for each additional transmission group based on the zone/RB/OCC/CS value can be transmitted from a BS to a UE through RRC signaling.

Based on the value of the SR zone related field, the UE may check information on a resource region where the UE can transmit an SR. For example, when the value of the SR zone related field is '2', there is one more additional SR transmission group, and an SR transmission resource region for the additional group can be distinguished from an SR transmission resource region for a UE that performs SR transmission as default in the corresponding subframe by at least one of an RB, an OCC, and a CS value.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

A method for transmitting a Scheduling Request (SR) in a wireless communication system and a terminal for the method are available industrially in various wireless communication systems such as 3GPP LTE/LTE-A and 5G systems.

What is claimed is:

1. A method of transmitting a Scheduling Request (SR) by a terminal in a wireless communication system, the method comprising:
   receiving information on periodicity of a SR transmission and resource regions for a periodic SR transmission;
   receiving Downlink Control Information (DCI) including a SR field related to SR transmission regions in a first subframe; and
   when the SR field indicates a specific value, checking whether resources for the SR transmission of the terminal are allocated to the first subframe even though the first subframe is not a subframe for the periodic SR transmission of the terminal according to the periodicity of the SR transmission,
   wherein the checking comprises obtaining a number of terminal groups, to which the SR transmission is additionally assigned in the first subframe based on the specific value and checking whether the terminal belongs to one of the number of terminal groups, to which the SR transmission is additionally assigned, and
   when the terminal belongs to one of the number of terminal groups, to which the SR transmission is additionally assigned, transmitting, by the terminal, the SR in the first subframe.

2. The method of claim 1, wherein a SR transmission resource region of the terminal in the first subframe is distinguished from a SR transmission resource region of another terminal transmitting a SR in the first subframe according to the periodicity.

3. The method of claim 2, wherein the SR transmission resource region of the terminal in the first subframe is distinguished from a SR transmission resource region of another terminal transmitting a SR in the first subframe by at least one of a Resource Block (RB), an Orthogonal Cover Code (OCC), and a Cyclic Shift (CS) value according to the periodicity.

4. The method of claim 1, wherein the information on the periodicity of the SR transmission and the resource regions for the periodic SR transmission is received through Radio Resource Control (RRC) signaling.

5. The method of claim 1, wherein the DCI corresponds to common DCI applied to other terminals besides the terminal.

6. The method of claim 1, wherein the specific value indicated by the SR field indicates a size of a resource region for the SR transmission.

7. The method of claim 1, wherein the specific value indicates a SR offset for the SR transmission.

8. The method of claim 6, wherein the number of terminal groups to which the SR transmission is additionally assigned is one smaller than a value of the SR size.

9. A terminal for transmitting a Scheduling Request (SR) in a wireless communication system, the terminal comprising:
   a receiver configured to receive information on periodicity of a SR transmission and resource regions for a periodic SR transmission and receive Downlink Control Information (DCI) including a SR field related to SR transmission regions in a first subframe; and
   a processor configured to, when the SR field indicates a specific value, check whether resources for the SR transmission of the terminal are allocated to the first subframe even though the first subframe is not a subframe for the periodic SR transmission of the terminal according to the periodicity of the SR transmission,
   wherein the processor is configured to obtain a number of terminal groups, to which the SR transmission is additionally assigned in the first subframe based on the specific value, and check whether the terminal belongs to one of the number of terminal groups, to which the SR transmission is additionally assigned, and
   a transmitter configured to transmit the SR in the first subframe when the processor checks whether the terminal belongs to one of the terminal groups, to which the SR transmission is additionally assigned.

10. The terminal of claim 9, wherein a SR transmission resource region of the terminal in the first subframe is distinguished from a SR transmission resource region of another terminal transmitting an SR in the first subframe according to the periodicity.

11. The terminal of claim 9, wherein the SR transmission resource region of the terminal in the first subframe is distinguished from a SR transmission resource region of another terminal transmitting a SR in the first subframe by at least one of a Resource Block (RB), an Orthogonal Cover Code (OCC), and a Cyclic Shift (CS) value according to the periodicity.

12. The terminal of claim 9, wherein the receiver is further configured to receive the information on the periodicity of the SR transmission and the resource regions for the periodic SR transmission through Radio Resource Control (RRC) signaling.

13. The terminal of claim 9, wherein the DCI corresponds to common DCI applied to other terminals besides the terminal.

14. The terminal of claim 9, wherein the specific value indicated by the SR field indicates a size of a resource region for the SR transmission.

15. The terminal of claim 9, wherein the specific value indicates a SR offset for the SR transmission.

16. The terminal of claim 14, wherein the number of terminal groups to which the SR transmission is additionally assigned is one smaller than a value of the SR size.

* * * * *